(12) United States Patent
Yoshimi et al.

(10) Patent No.: US 6,634,950 B2
(45) Date of Patent: Oct. 21, 2003

(54) GAME SYSTEM, GAME PROVIDING METHOD, AND INFORMATION RECORDING MEDIUM

(75) Inventors: Tetsuya Yoshimi, Tokyo (JP); Yoshinori Mishina, Tokyo (JP); Tsuneaki Matsuyama, Tokyo (JP)

(73) Assignee: Konami Corporation, Tokyo (JP)

( * ) Notice: Subject to any disclaimer, the term of this patent is extended or adjusted under 35 U.S.C. 154(b) by 32 days.

(21) Appl. No.: 09/915,513

(22) Filed: Jul. 27, 2001

(65) Prior Publication Data

US 2002/0013176 A1 Jan. 31, 2002

(30) Foreign Application Priority Data

Jul. 28, 2000 (JP) ........................... 2000-229865

(51) Int. Cl.[7] ............... G06F 17/60; A63F 9/24
(52) U.S. Cl. ....................................... 463/42
(58) Field of Search ................ 463/1–9, 30, 31, 463/40–44; 273/278; 705/36, 37

(56) References Cited

U.S. PATENT DOCUMENTS 4,363,489 A * 12/1982 Chodak et al. ............. 273/237
5,934,674 A * 8/1999 Bukowsky ................. 273/278
6,322,451 B1 * 11/2001 Miura ........................ 463/42

OTHER PUBLICATIONS

Column entitled "Toshi Simulation Game DeUdedameshi" (Have a Try at Investment Simulation Game) in "Hajimeteno Internet Kabushiki Toshi" (First Internet Stock Investment) by Yuzo Nishina, Ikeda Shoten Publishing Co., Ltd., pp. 124–125.

Column entitled "Kabushiki Toshi Kyoiku Cyugaku Koko de Donyu Hirogaru: Kaso Game Zyugyo de Katsuyo" (Stock Investment Education Increasingly Adopted in Junior and Senior High Schools: Simulation Games Utilized in Classrooms) in Yomiuri Shimbun, Sep. 20, 1999 (Morning Edition in Tokyo), p. 13.

* cited by examiner

*Primary Examiner*—Tony M. Argenbright
(74) *Attorney, Agent, or Firm*—Sughrue Mion, PLLC

(57) ABSTRACT

The appeal of a game can be increased by notifying actions performed in the game by other players. In a game system 10 for providing a virtual stock trade game to a plurality of players, the player-owned brand data is stored which represents the stock brands virtually owned by each player in a game space. At least one of the plurality of players is selected based on, for example, his/her performance in the game, and the portfolio of the selected player is publicized to the other players based on the player-owned brand data.

17 Claims, 19 Drawing Sheets

FIG. 5

| | |
|---|---|
| CHECK THE STOCK PRICE | |
| BRAND NAME | X COMPANY |
| CODE | # # # # |
| BUSINESS TYPE | SERVICE INDUSTRY |
| TRADING PRICE | 6900 |
| TIME FOR TRADING PRICE | ( 15 : 00 ) |
| COMPARISON TO PREVIOUS DAY | + 200 |
| PERCENTAGE OF RISE/FALL | + 2.99 % |
| VOLUME | 148300 |
| OPENING PRICE | 7000 |
| TIME FOR OPENING PRICE | ( 09 : 10 ) |
| HIGH | 7050 |
| TIME FOR HIGH | ( 09 : 39 ) |
| LOW | 6650 |
| TIME FOR LOW | ( 10 : 57 ) |
| BOARD LOT | 100 STOCKS |
| HIGH OF THE YEAR | 11750 |
| DATE OF HIGH OF THE YEAR | ( 2000 / 02 / 07 ) |
| LOW OF THE YEAR | 4850 |
| DATE OF LOW OF THE YEAR | ( 2000 / 04 / 17 ) |

FIG. 6

STOCK TRADE

BRAND NAME       X COMPANY

CODE             # # # #

CURRENT PRICE    7000

BOARD LOT        100 STOCKS

NUMBER OF STOCKS

○ BUY    ○ SELL

ORDER

FIG. 8

CONFIRMATION ON ASSET DETAILS

YOUR STANDING IS 98 AT THE CLOSING OF YESTERDAY.

◆ TOTAL ASSET VALUE
   15, 000, 000 YEN

◆ CASH
   5, 000, 000 YEN

◆ OWNED STOCKS

| | |
|---|---|
| BRAND NAME | X COMPANY |
| CODE | # # # # |
| NUMBER OF STOCKS | 100 STOCKS |
| CURRENT PRICE | 6900 YEN |
| COST | 6500 YEN |

| | |
|---|---|
| BRAND NAME | Y COMPANY |
| CODE | # # # # |
| NUMBER OF STOCKS | 10000 |
| CURRENT PRICE | 240 YEN |
| COST | 210 YEN |

NEXT

FIG. 10

INDIVIDUAL RANKING

PENNAME : SUZUKI

COURSE : EXPERT

NUMBER OF PARTICIPANTS : 1000

STANDING IN EVALUATED VALUE : 1

STANDINGS TABLE IN EVALUATED VALUE

FIG. 11

STANDINGS TABLE IN
EVALUATED VALUE

1 : SUZUKI
EVALUATED VALUE : 90000010

2 : SASAKI
EVALUATED VALUE : 90000009

3 : SATO
EVALUATED VALUE : 80000000

4 : TANAKA
EVALUATED VALUE : 77777777

5 : TARO
EVALUATED VALUE : 70000000

NEXT FIVE PEOPLE

OWNED STOCK INFORMATION

---

BRAND NAME : Z COMPANY

CODE : 1234

NUMBER OF STOCKS : 1000

CURRENT PRICE : 777

COST : 549

---

BRAND NAME : J COMPANY

CODE : 3078

NUMBER OF STOCKS : 100

CURRENT PRICE : 164

COST : 164

---

BRAND NAME : M COMPANY

CODE : 7032

NUMBER OF STOCKS : 1000

CURRENT PRICE : 302

COST : 331

---

NEXT 3 BRANDS

FIG. 13

BRAND INFOMATION

| | |
|---|---|
| BRAND NAME | Z COMPANY |
| CODE | 1234 |
| BUSINESS TYPE | FISHERIES AND AGRICULTURE |
| TRADING PRICE | 777 |
| TIME FOR THE TRADING PRICE | ( 15 : 00 ) |
| COMPARISON TO PREVIOUS DAY | + 14 |
| PERCENTAGE OF RISE/FALL | + 0.61 % |
| VOLUME | 531000 |
| OPENING PRICE | 763 |
| TIME FOR OPENING PRICE | ( 09 : 00 ) |
| HIGH | 780 |
| TIME FOR HIGH | ( 09 : 27 ) |
| LOW | 761 |
| TIME FOR LOW | ( 13 : 14 ) |
| BOARD LOT | 1000 STOCKS |
| NEW HIGH | 801 |
| DATE OF NEW HIGH | ( 2000 / 01 / 04 ) |
| NEW LOW | 750 |
| DATE OF NEW LOW | ( 2000 / 04 / 21 ) |

FIG. 14

TIME TRIAL RANKING
(EXPERT)

1 : AOKI

38 DAYS

2 : IWATA

42 DAYS

3 : SHIMADA

43 DAYS

4 : NAKANO

44 DAYS

5 : SAITO

46 DAYS

NEXT FIVE PEOPLE

FIG. 15

, K COMPANY, 4260, -20, ACCORDING TO SOME NEWS, K COMPANY HAS DEVELOPED A NEW PRODUCT COLORANT DISPERSED TYPE PHOTOSENSITIVE MATERIAL FOR LCD. K COMPANY HOPES FOR INCREASED SALES FOR LARGE MONITORS AND LIQUID CRYSTAL TVS. THE NEW PRODUCT "X X X X X" SATISFIES CONFLICTING DESIRES OF INCREASED COLOR REPRODUCIBILITY WITHOUT DECREASE IN THE TRASMITTANCE.

FIG. 16

---
VIRTUAL STOCK TRADE GAME
---

# # #

K COMPANY

4260  -20

ACCORDING TO SOME NEWS,
K COMPANY HAS DEVELOPED A NEW
PRODUCT COLORANT DISPERSED TYPE
PHOTOSENSITIVE MATERIAL FOR LCD.

K COMPANY HOPES FOR INCREASED
SALES FOR LARGE MONITORS AND
LIQUID CRYSTAL TVS.

THE NEW PRODUCT " X X X X X "
SATISFIES CONFLICTING DESIRES
OF INCREASED COLOR
REPRODUCIBILITY WITHOUT DECREASE
IN THE TRASMITTANCE.

FIG. 18

| |
|---|
| BRAND CODE |
| BOND TYPE |
| EXCHANGE CODE |
| CONDITION |
| OPENING PRICE |
| TIME FOR OPENING PRICE |
| HIGH |
| TIME FOR HIGH |
| LOW |
| TIME FOR LOW |
| CURRENT PRICE |
| TIME FOR CURRENT PRICE |
| NUMBER OF STOCK VOLUME |
| TIME FOR VOLUME |
| CLOSING PRICE OF THE PREVIOUS DAY |
| COMPARISON TO PREVIOUS DAY |
| PERCENTAGE OF RISE/FALL |
| DATE OF HIGH OF THE YEAR |
| HIGH OF THE YEAR |
| DATE OF LOW OF THE YEAR |
| LOW OF THE YEAR |
| 33 BUSINESS TYPE NAME |
| FACE VALUE |
| BOARD LOT |
| FORMAL COMPANY NAME IN JAPANESE |
| ABBREVIATED COMPANY NAME |
| FORMAL COMPANY NAME REPRESENTED IN JAPANESE LETTERS |
| FORMAL COMPANY NAME REPRESENTED IN ALPHABETIC CHARACTERS |
| ADDITIONAL ABBREVIATIONS |

FIG. 19

| |
|---|
| PLAYER ID |
| PENNAME |
| MAIL ADDRESS |
| GAME FLAG |
| GAME START DATE |
| GAME TIME |
| GAME COMPLETION DATE |
| NUMBER OF TRADES ( TODAY ) |
| NUMBER OF TRADES ( TOTAL ) |
| CASH |
| EVALUATED VALUE ( TODAY ) |
| EVALUATED VALUE ( YESTERDAY ) |
| EVALUATED VALUE RANKING |

FIG. 20

| PLAYER ID |
|---|
| OWNED BRAND CODE |
| NUMBER OF OWNED STOCKS FOR THE BRAND |
| COST FOR THE OWNED BRAND |

GAME SYSTEM, GAME PROVIDING METHOD, AND INFORMATION RECORDING MEDIUM

BACKGROUND OF THE INVENTION

1. Field of the Invention

The present invention relates to a game system, game providing method, and information recording medium.

2. Description of the Related Art

Conventionally, a game machine is known in which players having the best scores for a game are displayed in a list, for example, after a game is completed and until a game is restarted. In such a game machine, the player with the best scores can have a feeling of accomplishment by being included in the list.

However, in the conventional game machines, other players cannot know how a player with a good score played in the game and achieved the good score. Although not limited to players with the best scores, if other players can see how the game is played to achieve better scores, it would greatly assist the other players.

The present invention has been conceived to solve the above mentioned problem and one object of the present invention is to notify how the other players are playing the game, and to provide a game system, game providing method, and information recording medium in which the interest in the game is increased.

SUMMARY OF THE INVENTION

In order to solve the problem mentioned above, according to one aspect of the present invention, there is provided a game system for providing a game to a plurality of players, comprising: score related manipulation content data storing means for storing score related manipulation content data which represents the content of the game manipulation input of each player and which is used as a basis for calculating final score or progress score of each player; player selecting means for selecting at least one player from among the plurality of players; and information providing means for providing information related to the content of the game manipulation input of the selected player based on the score related manipulation content data of the player selected by the player selecting means, to at least one player who is different from the selected player.

According to another aspect of the present invention, there is provided a game providing method for providing a game to a plurality of players, comprising: a score related manipulation content data storing step for storing score related manipulation content data which represents the content of the game manipulation input of each player and which is used as a basis for calculating final score or progress score of each player; a player selecting step for selecting at least one player from among the plurality of players; and an information providing step for providing information related to the content of the game manipulation input of the selected player based on the score related manipulation content data of the player selected in the player selecting step, to at least one player different from the selected player.

According to another aspect of the present invention, there is provided an information recording medium for recording a program which causes a computer to function as a game system for providing a game to a plurality of players, the program causing the computer to execute the steps of: storing score related manipulation content data which represents the content of the game manipulation input of each player and which is used as a basis for calculating final score or progress score of each player; selecting at least one player from among the plurality of players; and providing information related to the content of the game manipulation input of the selected player based on the score related manipulation content data of the player selected in the player selecting step, to at least one player who is different from the selected player.

In the present invention, a game is provided to a plurality of players and score related manipulation content data is stored. The score related manipulation content data represents the content of the game manipulation input of each player and is used as a basis for calculating the final score or progress score of each player. At least one player is selected from among a plurality of players, and information related to the content of the game manipulation input of the selected player is provided to at least one of the other players based on the score related manipulation content data of the selected player. The "score" is not limited to the goal of the game, but includes any evaluation for the content of the game manipulation input by the players. According to the present invention, it is possible to notify how the other players are trying to achieve a better score, and thus, increase the appeal of the game.

According to another aspect of the present invention, it is preferable that the game system is configured to provide a virtual venture trade game to a plurality of players, in which virtual venture trade is performed in a game space, the score related manipulation content data storing means stores, as the sore related manipulation content data, owned venture target data which represents the venture target virtually owned by each player in the game space, currently or in the past; and the information providing means provides information related to the venture target virtually owned by the selected player in the game space, currently or in the past, based on the owned venture target data. The venture trade includes, for example, stock trade, estate trade, futures trade, exchange trade, and option trade. The venture target includes, for example, stock, real estate, futures, exchange, and option. The information related to the venture target virtually owned by the player in the game space, currently or in the past, is for example, the portfolio (asset allocation) of the player in the present or in the past. According to this aspect of the present invention, it is possible to notify how the other players are trying to achieve a better score by owning a venture target.

According to another aspect of the present invention, it is preferable that the player selecting means selects at least one player from among the plurality of players based on the game score of each player. In this manner, the other players can know how, for example, a player with a better score has played in the game.

According to another aspect of the present invention, it is preferable that the information providing means provides the information in association with the final or progress score of the selected player. In this manner, it is possible to know how the other players played in the game and resultant score of such a method of play.

According to another aspect of the present invention, there is provided a game system for providing a stock trade game, for virtually trading stocks in a game space, to a plurality of players, the system comprising: owned stock brand data storing means for storing the owned stock brand data which represents the stock brand currently and virtually owned by each player in the game space; player selecting means for selecting at least one player from among the plurality of players; and information providing means for choosing a portion of stock brands currently owned by the player selected by the player selecting means based on the owned stock brand data and on the stock brands currently owned by other players, and for informing at least one player who is different from the selected player, of the chosen portion of stock brands.

According to another aspect of the present invention, there is provided a game providing method for providing a stock trade game, in which stock is virtually traded in a game space, to a plurality of players, the method comprising: an owned stock brand data storing step for storing, in storing means, owned stock brand data which represents the stock brands currently and virtually owned by each player in the game space; a player selecting step for selecting at least one player from among the plurality of players; and an information providing step for choosing a portion of stock brands currently owned by the player selected in the player selecting step based on the owned stock brand data and on the stock brands currently owned by other players, and for informing at least one player who is different from the selected player, of the chosen portion of stock brands.

According to the present invention, the stock brands currently owned by the player selected by the player selecting means are not informed in their entirety, but only partially informed. Because of this, only significant information can be notified to the players. In this manner, when the stock brand is to be notified to a portable phone, for example, the notified information can be preferably displayed even on a small display. Moreover, the amount of communication can be reduced. Furthermore, because the portion of the stock brand currently owned by the player selected by the player selecting means is chosen based on the stock brands currently owned by other players, the stock brands that are not owned by other players in a large amount, for example, can be chosen as the portion, and thus, interesting information can be provided to the other players. In this manner, it is possible to notify how the other players are trying to achieve a better score, and thus, increase the appeal of the game.

According to another aspect of the present invention, there is provided a game system for providing a virtual stock trade game to a plurality of players in which real stock is virtually traded in a game space and the value of stocks owned by the players is evaluated based on the stock price data in real life, the game system comprising: owned stock brand data storing means for storing owned stock brand data which represents the stock brands currently and virtually owned by each player in the game space; player selecting means for selecting at least one player from among the plurality of players; and information providing means for choosing a portion of stock brands currently owned by the player selected by the player selecting means based on the owned stock brand data and on data representing the real life stock trading condition or virtual stock trading condition in the game space, and for informing at least one player who is different from the selected player, of the chosen portion of stock brands.

According to another aspect of the present invention, there is provided a game providing method for providing a virtual stock trade game to a plurality of players in which a real stock is virtually traded in a game space and the value of stocks owned by the players is evaluated based on the stock price data in real life, the method comprising: an owned stock brand data storing step for storing, in storing means, owned stock brand data which represents the stock brands currently and virtually owned by each player in the game space; a player selecting step for selecting at least one player from among the plurality of players; and an information providing step for choosing a portion of stock brands currently owned by the player selected at the player selecting step based on the owned stock brand data and on data representing the real life stock trading condition or virtual stock trading condition in the game space, and for informing at least one player, who is different from the selected player, of the chosen portion of stock brands.

According to the present invention, the stock brands currently owned by the player selected by the player selecting means are not informed in their entirety, but are only partially informed. Because of this, only the significant information can be informed to the players. In this manner, when the stock brand is to be informed to a portable phone, for example, the informed information can be preferably displayed even on a small display. Moreover, the amount of communication can be reduced. Furthermore, because the portion of the stock brand currently owned by the player selected by the player selecting means is chosen based on the data which represents the real life stock trading condition or virtual stock trading condition in the game space, the stock brands that seem interesting to the other players, for example, can be chosen as the portion depending on the real life or virtual stock trading condition. The data representing the stock trading condition is data for inferring the stock brands that are spotlighted in the real life or virtual stock trading market, and includes, for example the current volume of each stock brands or the like. In this manner, it is possible to notify how the other players are trying to achieve a better score, and thus, increase the appeal of the game.

According to another aspect of the present invention, it is preferable that the data representing the real life stock trading condition includes data representing real life volume ranking or virtual volume ranking in the game space. In this manner, the stock brands can be chosen, for example, which seem interesting to other players based on the volume ranking. According to another aspect of the present invention, it is preferable that the information providing means chooses, as the portion, stock brands currently owned by the selected player and which are lower in the volume ranking than a predetermined standing. In this manner, the stock brands currently owned by the selected player but have a low standing in the volume ranking can be notified to the other players.

According to another aspect of the present invention, it is preferable that the data representing the real life stock trading condition includes data representing real life volume of each stock brand or virtual volume of each stock brand in the game space. In this manner, stock brands can be chosen, for example, which seem interesting to other players based on the real life or virtual volume of each stock brand. According to another aspect of the present invention, it is preferable that the information providing means chooses, as the portion, stock brands currently owned by the selected player and which has a volume lower than a predetermined volume. In this manner, stock brands owned by the player but having a low volume can be informed to the other players.

BRIEF DESCRIPTION OF THE DRAWING

FIG. 5 shows an example of a game screen for checking the stock price.

FIG. 6 shows a game screen for a case where "stocktrade" depicted in FIG. 3 is selected.

FIG. 8 shows a game screen for a case where "confirm asset details" depicted in FIG. 2 is selected.

FIG. 10 shows a game screen for a case where "individual ranking" depicted in FIG. 9 is selected.

FIG. 11 shows a game screen for a case where "evaluated value standing table" depicted in FIG. 10 is selected.

FIG. 12 shows a game screen for a case where "Sato" depicted in FIG. 11 is selected.

FIG. 13 shows a game screen for a case where "Z company" depicted in FIG. 12 is selected.

FIG. 14 shows a game screen for a case where "time trial ranking" depicted in FIG. 9 is selected.

FIG. 15 shows an example of stock related information data which is to be uploaded from the data input terminal for a stock analyst to the game server.

FIG. 16 shows an example of electronic mail which contains stock related information.

FIG. 18 is a diagram showing a structure of the stock price data to be stored in the stock price data storing section.

FIG. 19 is a diagram showing a structure of the main player data to be stored in the player data storing section.

FIG. 20 is a diagram showing a structure of the player-owned brand data to be stored in the player data storing section.

DESCRIPTION OF PREFERRED EMBODIMENT

Figure 1:
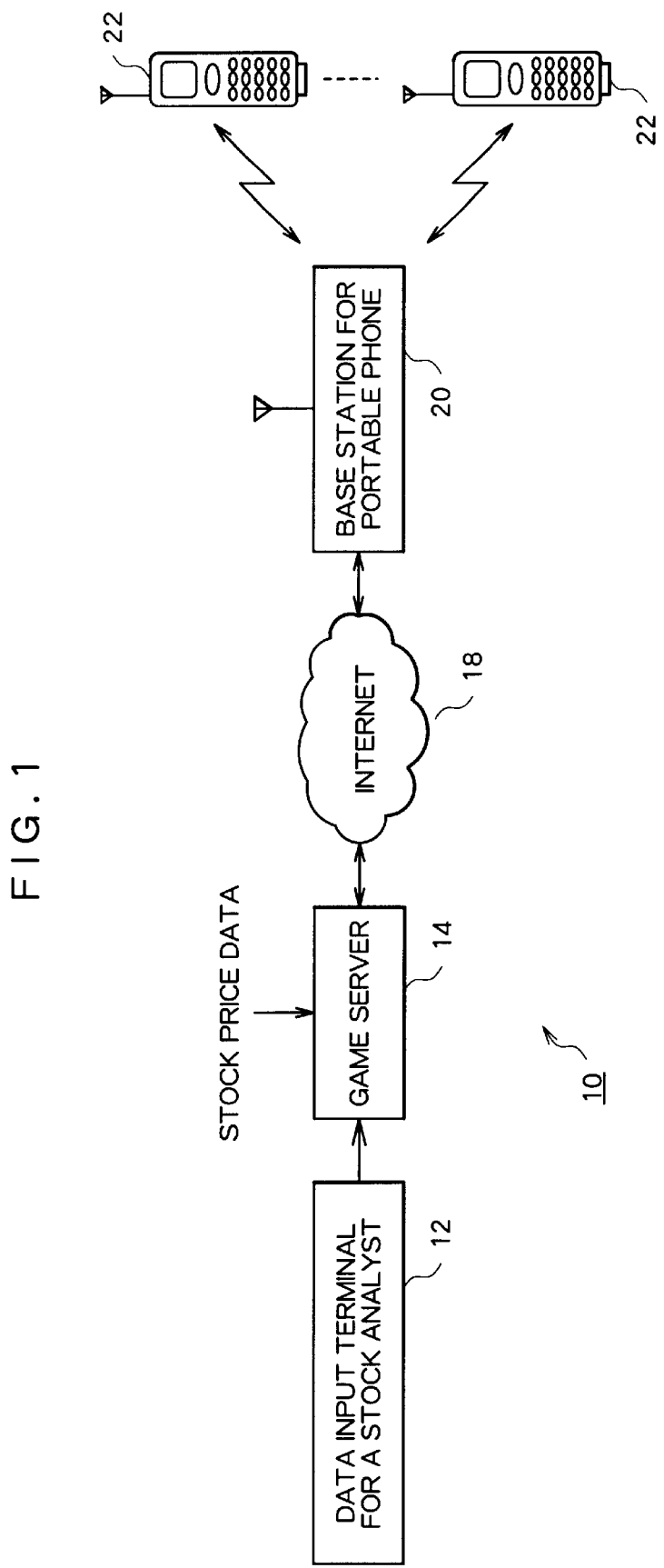
FIG. 1 is a diagram showing the overall structure of the game system according to the embodiment of the present invention.

The entire disclosure of the corresponding Japanese application 2000-229865 filed on Jul. 28, 2000 including specification, claims, drawings and summary, is incorporated by reference herein.

The preferred embodiment of the present invention will now be described in detail referring to the drawings.

FIG. 1 is a diagram showing the overall structure of a game system related to a preferred embodiment of the present invention. As shown in FIG. 1, a game system 10 comprises a data input terminal 12 for a stock analyst, a game server 14, the Internet 18, a base station 20 for portable phone, and portable phones 22. In the game system 10, a virtual stock trading game is provided from the game server 14 to a plurality of portable phones 22 via the Internet 18 and the base station 20 for portable phone. A player follows the game screen displayed on the display of a portable phone 22 and designates a stock brand to virtually sell or buy the stocks.

A characteristic of the game system 10 is that almost real time stock price data of real life (the real world) is supplied to the game system 14 and the players can simulate stock trade based on the supplied stock price data. The players can virtually sell or buy, in the game space, stock brands that actually exist and possess stock assets in the game space. The stock assets are evaluated based on the real stock price data. Thus, the players can virtually experience changes in assets due the stock price changes in real life.

Also, the game system 10 is configured so that stock related information (venture target related information) for the stock brands owned by a player in the game space is sent via an electronic mail. The stock related information is input from the data input terminal 12 for a stock analyst and is uploaded to the game server 14. The stock related information is input with an association to the stock brand, and the game system 10 is configured so that the stock related information associated with a stock brand is provided only to the players who virtually own that stock brand in the game space. When the portable phone 22 includes an electronic mail receiving function, the player can receive the information related to the stock brand virtually owned by the player himself or herself in the game space on the same portable phone 22 which is used for playing the virtual stock trade game. The electronic mail containing stock related information can be received at a personal computer or at a mobile information terminal or the like, instead of the portable phone 22.

In FIG. 1, the data input terminal 12 for a stock analyst is constructed from, for example, a personal computer, and is connected to the game server 14 by a communication connection. The data input terminal for a stock analyst is for a stock analyst to input stock related information or the like. When inputting stock related information, the stock brand to which the information is related is also input, so that the stock related information is associated with the stock brand. Stock related information data which includes both the stock related information and the associated brand is transferred to the game server 14 via a communication channel.

The game server 14 is constructed from, for example, a server computer, and is communication connected to the data input terminal 12 for a stock analyst and to the Internet 18. Also, stock price data is supplied to the game server 14 in almost real time (to be precise, stock price data is supplied every five minutes with a delay from real life of 20 minutes) from a server computer provided at a broker or a stock exchange via, for example, a dedicated line. The game server 14 provides the game to portable phones 22 via the Internet 18 through HTTP (HyperText Transfer Protocol). In other words, the portable phones 22 include a web browsing function. When a player inputs the URL (Uniform Resource Locator) of the game server 14 using a portable phone 22, the URL is transmitted to the game server 14 via the base station 20 for portable phone and Internet 18. At the game server 14, the URL is interpreted as a game command, and hyper text is produced corresponding to the game command. The hyper text is then returned to the portable phone 22 via the Internet 18 and the base station 20 for portable phone. At the portable phone 22, a game screen is displayed on the display based on the received hyper text. The game screen includes link buttons that represent the game commands that can be selected by the player. When the player selects one of the buttons, a URL representing the game command is transmitted to the game server 14.

The base station 20 for portable phone is also connected to a public phone line (not shown), and relays the phone messages of the portable phone 22 and data communication (for example, using electronic mail transmitting/receiving function and web browsing function). The portable pone 22 is used by the player as a terminal for enjoying the virtual stock trade game provided from the game server 14, and is a general-purpose and known portable phone particularly with an electronic mail transmitting/receiving function and web browsing function, in addition to the general phone function.

With the above structure, a virtual stock trade game is provided to a plurality of portable phones 22 from the game server 14. The content of the virtual stock trade game provided to the players by the game system 10 having such a structure will now be described. FIGS. 2 through 14 show the game screens displayed on the display of the portable phone 22. All of these game screens are synthesized and displayed on the display by the portable phone 22 based on the hyper text transmitted from the game server 14.

Figure 2:
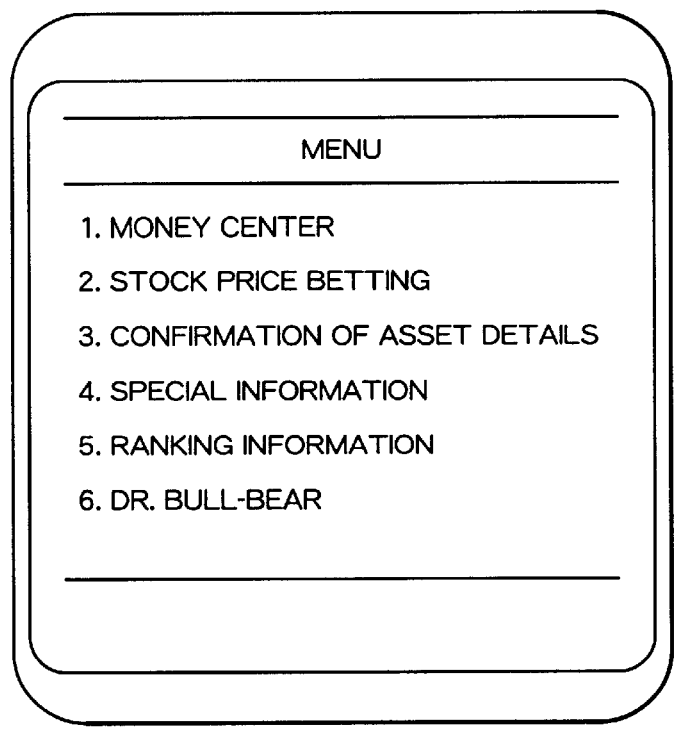
FIG. 2 is a diagram showing the main menu of the virtual stock trade game.

FIG. 2 shows the main menu. The main menu is synthesized based on the hyper text returned from the game server 14 when a player sends a specific URL to the Internet 18 for receiving the provision of the virtual stock trade game. In this menu, the player can select from among six items, "money center", "stock price betting", "confirmation of asset details", "special information", "ranking information" and "Dr. Bull-Bear".

Figure 3:
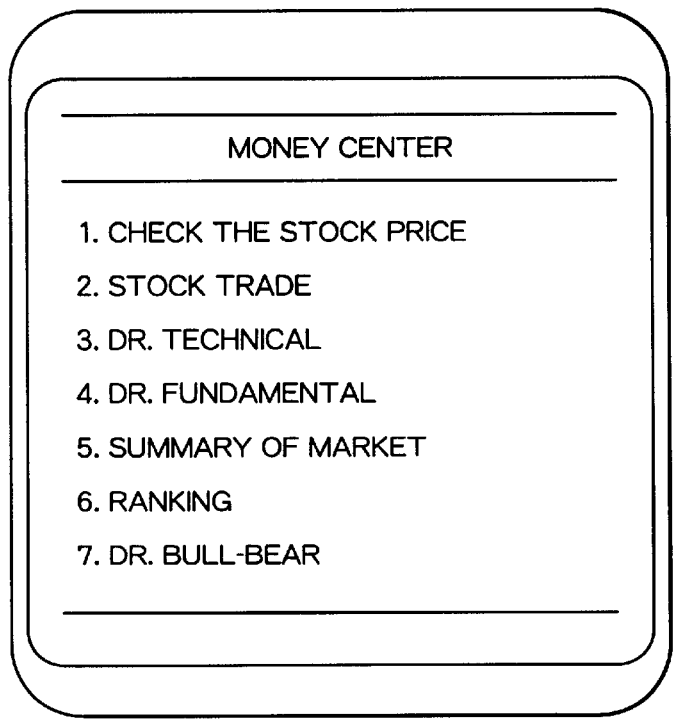
FIG. 3 is a diagram showing the sub-menu for the "money center" depicted in FIG. 2.

FIG. 3 shows the game screen displayed on the display of the portable phone 22 when the player selects the "money center" at the main menu shown in FIG. 2. The game screen depicted in FIG. 3 is a sub-menu of the "money center", and allows a player to select from among seven items, "check the stock price", "stock trade", "Dr. Technical", "Dr. Fundamental", "summary of market", "ranking", and "Dr. Bull-Bear".

Figure 4:
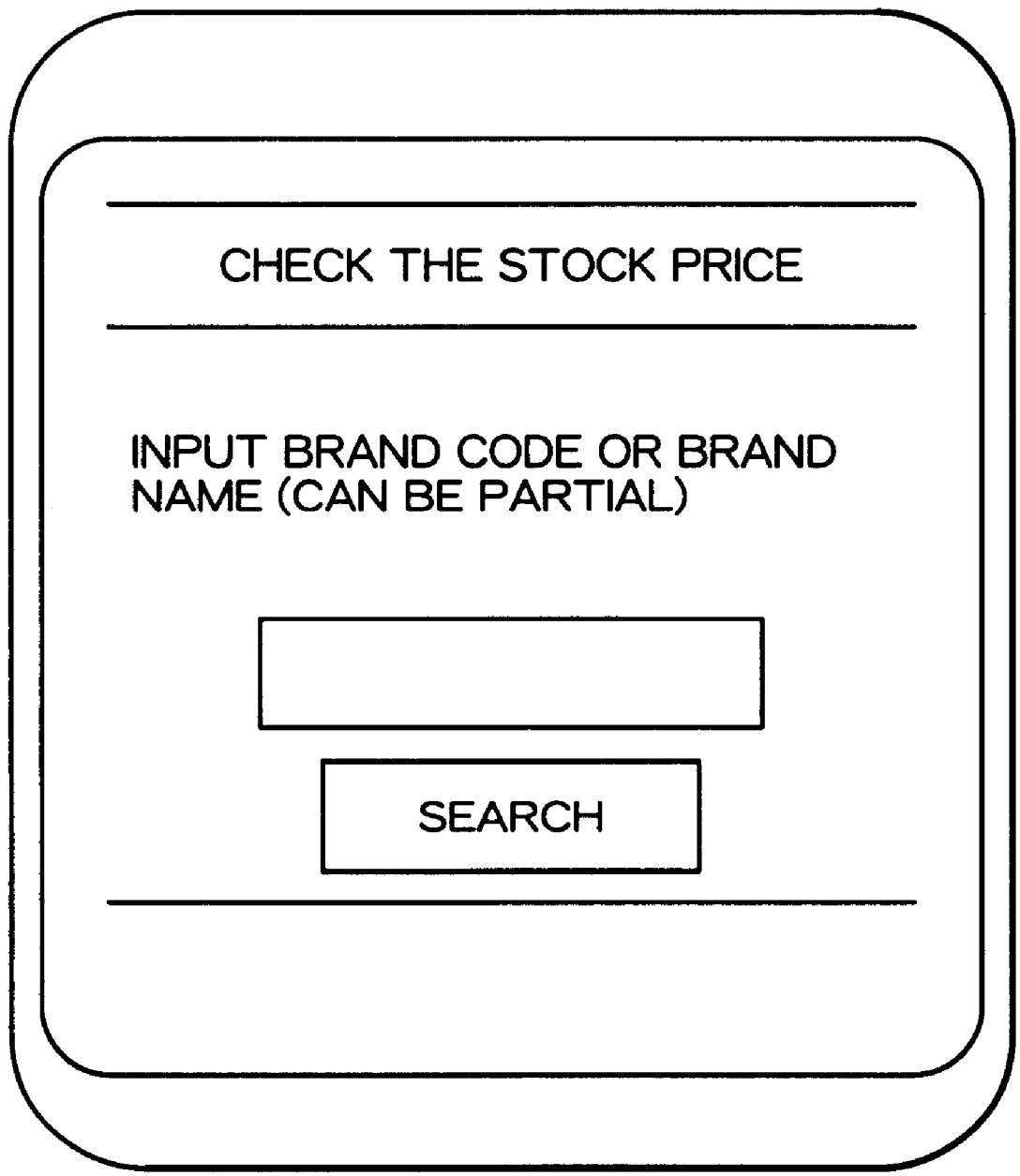
FIG. 4 is a diagram showing the game screen when "check the stock price" depicted in FIG. 3 is selected.

FIG. 4 shows a game screen displayed on the display of the portable phone 22 when the player selects "check the stock price". The game screen depicted in FIG. 4 is a screen for the player to specify a stock brand and displays a form. When the player inputs the brand code or brand name in this form and presses on the search button located below the form, a search request (URL) is transmitted to the game server 14 with the input content to the form as an argument. The game server 14, upon receiving this search request, performs a search for the stock brand. If the input content of the form only contains a number, stock price information related to the stock brand having the brand code which matches the number is returned. As will be described later, stock price data (FIG. 18) is held at the game server 14, and the stock price information is transmitted based on the stock price data. When the input content of the form includes text, on the other hand, the game server 14 selects a stock brand in which the input text matches any one of the formal company name in Japanese, the abbreviated company name, the formal company name represented in Japanese letters, the formal company name represented in alphabet, or other names that identify the company. The game server 14 then transmits the stock price information of the selected stock brand. The formal company name in Japanese, the abbreviated company name, the formal company name represented in Japanese letters, the formal company name represented in alphabetic characters, or other names that identify the company are respectively recorded as "formal company name in Japanese", "abbreviated company name", "formal company name represented in Japanese letters", "formal company name represented in alphabet" and "additional abbreviations" in the stock price data shown in FIG. 18.

FIG. 5 shows an example of the stock price information provided from the game server 14. The stock price information shown in FIG. 5 is, as described above, based on almost real time stock price data supplied from a broker or a stock exchange. The players judge the investing brand and the trade timing using the stock price information.

When a player selects "stock trade" from the sub-menu of "money center" shown in FIG. 3, the player can execute a virtual stock trade in the game space. In this case, a form inputting screen similar to the game screen of FIG. 4 is displayed on the display of the portable phone 22. The player selects a brand to be sold or bought by inputting a brand code or company name or the like. FIG. 6 shows a game screen displayed on the display of portable phone 22 after a player has specified a brand. The player then inputs the number of stocks to be traded and the selection of either buying or selling on this screen, and transmits these information items as an argument in a URL to the game server 14 by pressing on an "order" button. When the game server 14 receives the URL, the game server identifies the user of the portable phone 22, that is, the player, from the header information. Upon receiving a buying or selling order, the game server 14 updates the data corresponding to the ordering player (main player data and the player-owned brand data). As will be described later, the main player data is for storing the evaluation value of the stock owned by each player and the available cash or the like, and the player-owned brand data is for storing the information related to the stock brands owned by each player.

When "Dr. Technical" is selected from the sub-menu of "money center" shown in FIG. 3, a technical analysis is provided to the player. In the technical analysis, a five-level evaluation is provided for three items, namely directivity, stock price level, and timing, for the brand designated by the player. Technical data (for example, moving average of stock price, standard deviation, moving average disjunction rate, one division balance table, etc.) which form the basis for the evaluation are also provided. When a player selects "Dr. Fundamental" from the sub-menu, a financial analysis is provided to the player. In the financial analysis, a five-level evaluation is shown for four items, profitability, stability, growth, and inexpensiveness, for the brand designated by the player. The financial data (for example, return on sales, return on assets, ROE (return on equity), asset turnover, equity turnover, current ratio, dependency on interest debt, sales growth, PER (price-earnings ratio), PBR (price book-value ratio), etc.) which forms the basis for the evaluation is also provided. When a player selects "summary of market" from the sub-menu, a summary description of the market is provided to the player. The system is configured so that the original data of the summary description is uploaded from the data input terminal 12 for a stock analyst to the game server 14. Furthermore, when a player selects "ranking", various brand rankings such as, for example, ranking for volume of the day, ranking for price increase percentage, and ranking for price decrease percentage, are provided. These rankings are produced by the game server 14 based on the stock price data for provision to the players. When "Dr. Bull-Bear" is selected from the sub-menu, explanation of the sub-menu and of the stock terms are provided to the player.

Figure 7:
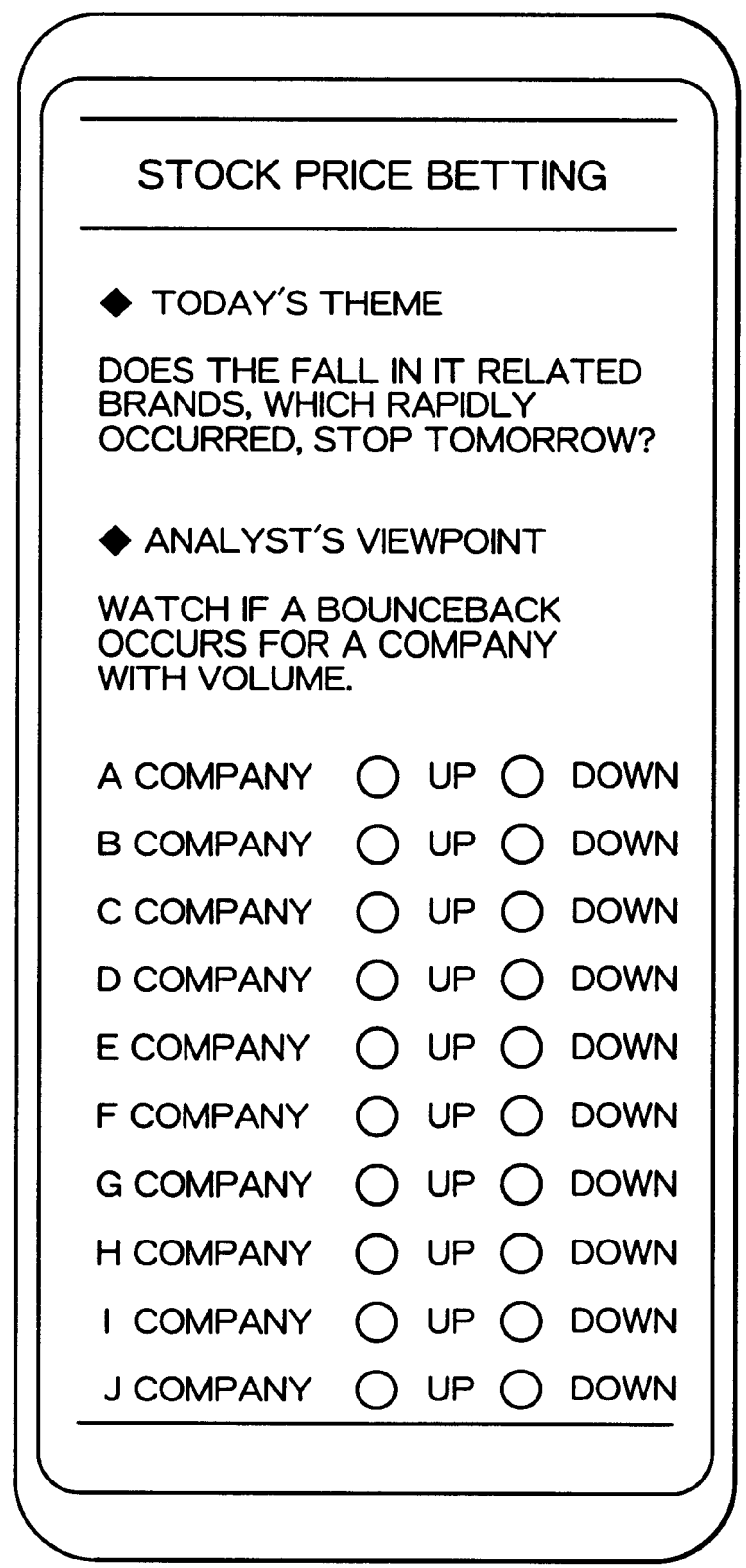
FIG. 7 shows a game screen for a case where "stock price betting" depicted in FIG. 2 is selected.

Referring back to FIG. 2, when a player selects "stock price betting" at the main menu shown in FIG. 2, a stock price betting game is provided to the player. FIG. 7 shows an example of a game screen for the stock price betting game. The price stock betting game is a game where the performance, for the following day, of the stock price for 10 brands selected by a stock analyst is predicted on a daily basis. In the game screen shown in FIG. 7, the target for the betting game is described under the column entitled "Today's Theme" and the opinion of the stock analyst is shown in the column entitled "Analyst's Viewpoint". The player selects either "up" or "down" for the 10 brands considering the "Analyst's Viewpoint". The system is configured so that the selected content is stored at the game server 14 in association with the player. A bonus (such as, for example, virtual cash in the game space) is given to the player who correctly predicted for all brands, based on the stock price data for the following day.

When a player selects "confirmation of asset details" from the main menu, the player can confirm the details of the virtual asset he/she currently and virtually owns in the game space. FIG. 8 shows a game screen displayed on the display of the portable phone 22 when such a selection is made. As shown in FIG. 8, the standings of the player based on the total value of the asset evaluated with the closing price of the previous day is shown, and at the same time, the breakdown of the asset for cash and owned stock is also shown. When a player selects "Next" in the game screen shown in FIG. 8, information related to other owned stocks which did not fit in the first screen can be obtained.

When a player selects "special information" from the main menu, a live comment and ranking information are provided to the player. The live comment is information uploaded from the data input terminal 12 for a stock analyst to the game server 14, and shows, for example, the reason for a large change in the stock price for a brand in which such a change occurred. In the provision of the live comment, first, the list of the brands for which the comments are already uploaded and the upload time are shown to the player. When the player selects one entry from the list, detailed comment is shown to the player. The ranking information is for providing stock price ranking information that is given by a broker to the player. When a player selects "Dr. Bull-Bear" from the main menu, an explanation of the main menu and of the stock terms are provided to the player.

Figure 9:
FIG. 9 shows a game screen for a case where "ranking information" depicted in FIG. 2 is selected.

When a player selects "ranking information" at the main menu, a player ranking for the virtual stock trade game will be given. FIG. 9 shows a sub-menu displayed on the display of the portable phone 22 after "ranking information" is selected at the main menu. In the sub-menu, the player can select from among three items, "individual ranking", "time trial ranking", and "brand possession ranking". As shown in FIG. 10, the "individual ranking" is for a player to refer to his/her ranking, and the player can see his/her penname, the course that the player is participating in (as will be described, three courses are provided depending on the seed money (capital)), the total number of participants, and current standing in the evaluated value. The game screen also includes a link button for "standings table in evaluated value". When a player presses on this button, the standings table in evaluated value is shown.

FIG. 11 shows an example of a game screen for showing the standings table in evaluated value. As shown in FIG. 11, the standings table in evaluated value shows, for example, 20 top people in order of decreasing evaluated value of the stock asset based on the previous day's closing price. Five people are shown in one screen with the penname and evaluated value. When a player presses on a link button for "next five people", the pennames and the evaluated values for the next five people are shown. Each penname is shown as a link button. When the player selects any of the pennames and presses on the link button, the player can refer to the portfolio of the player having that penname. FIG. 12 is a game screen displayed when, for example, a player presses on a link button "Sato" in the game screen shown in FIG. 11, and shows the brand names, brand codes, number of owned stocks, current stock price of the brands, and average costs paid for obtaining the brands for the three brands that are currently and virtually owned in the game space by the player whose penname is "Sato". When a player presses on a link button "next three brands" at the game screen shown in FIG. 12, data such as the brand name for the next three brands are shown. In this manner, in the virtual stock trade game, the portfolio of the player who currently owns a large amount of assets can be notified in detail to the other players, and thus, the other players can trade stocks referring to the portfolio. In this example, the game system is configured to publicize the portfolio for better players, but it is also possible to publicize the portfolio for worse players. It is also possible to configure the game system so that at least one player is randomly selected regardless of his/her performance in the game for publicizing the portfolio. The publicized portfolio is not limited to the current portfolio, and the past portfolio of a player can also be publicized. Instead of showing the total portfolio, it is possible to only display the owned brands with higher evaluated value or owned brands with higher price increase percentages. In either case, by publicizing, to the other players, the data which forms the basis for calculating the final score or progress score along with the game manipulation input from the portable phone 22, that is, score related manipulation content data, the other players can use the data as a reference for his/her own stock trading.

Here, the entire portfolio of a player with a better score is notified to the other players. However, it is also possible to notify only a portion of the portfolio. In this manner, significant but low volume information can be provided to the portable phone 22, resulting in a decrease in the amount of communication data, and the player can see the significant information at once on a small display.

In this case, the game system can be configured so that the portion of the portfolio can be chosen based on the condition of the real life stock trade. For example, it is possible, when the player with a better score designated by a player owns a stock brand whose standing in the volume is lower than a predetermined standing in the real life volume ranking (managed by a ranking managing section 44 (FIG. 17)), to choose such a brand from among all the owned brands, for publicizing to the other players. Alternatively, it is possible, when the player with a better score designated by a player owns a stock brand whose real life volume is less than a predetermined volume based on the volume of each brand in real life space (volume, stored in a stock price data storing section 40 (FIG. 17)), to choose such a brand from among all the owned brands, for publicizing to the other players.

Alternatively, the portion of the portfolio can be chosen based on the condition of the virtual stock trade in the game space. For example, it is possible, when the player with a better score owns a stock brand whose standing in volume is lower than a predetermined standing in the volume ranking (produced by the ranking managing section 44 (FIG. 17) based on the stored content of a player data storing section 42 (FIG. 17)) of the virtual stock trade in the game space, to choose such a brand from among all the owned brands, for publicizing to the other players. Alternatively, it is possible, when the player with a better score owns a stock brand whose volume in real life is lower than a predetermined volume based on the volume of each brand in the virtual stock trade in the game space (produced by, for example, a main game processing section 32 (FIG. 17) based on the selling order and buying order from the players), to choose such a brand from among all the owned brands, for publicizing to the other players.

In the game screen of FIG. 12, each brand name is shown as a link button. When a player selects any of the brand names and presses on the link button, the detailed information for that brand can be obtained. FIG. 13 shows a game screen displayed on the display of the portable phone 22 when such a selection is made.

When a player selects "time trial ranking" in the sub-menu shown in FIG. 9, for example, 20 top players who made 100 million yen in the least amount of time (in game period) from the seed money are shown for each course in order of increasing time. Five players are shown in one screen. FIG. 14 shows an example of a game screen which shows the time trial ranking. As shown in FIG. 14, the time trial ranking is separately produced for expert course, intermediate course, and beginner course. When a player designates a course, the time trial ranking for that course is returned to the portable phone 22. It is also possible to configure the game system so that upon receiving a URL for requesting a time trial ranking from a player, the game server 14 checks the course that the player is currently participating in, and automatically returns the time trial ranking for that course only. The time trial ranking shows, in the order of increasing the game time, the pennames and the game times. When a player presses on "next five players", the subsequent ranking is shown. It is also possible to configure each penname as a link button in the time trial ranking shown in FIG. 14 so that when a player selects a penname and presses on the link button, the stock brand finally owned by the player having the selected penname or the history of stock trading is shown. In this manner, playing styles of other players can be studied.

When a player selects "brand possession ranking" in the sub-menu shown in FIG. 9, a ranking is shown for the brands which are owned most by the players from among the stocks currently and virtually owned by the player in the game space.

In the game system 10 of the embodiment, the stock related information is distributed from the game server 14 to the players through electronic mail. The information that forms the basis for the stock related information (stock related information data) is uploaded from the data input terminal 12 for a stock analyst to the game server 14. FIG. 15 shows an example of the content of the stock related information data. As shown in FIG. 15, in the stock related information data, a brand code and a brand name are included before the stock related information. In this manner, the stock related information and the stock brand are associated and uploaded to the game server 14. Upon receiving the stock related information data, the game server 14 transmits this information in the form of an electronic mail to the players who currently own the stocks of the stock brand associated with the received stock related information. FIG. 16 shows an example of an electronic mail transmitted in this manner. The electronic mail of FIG. 16 is produced and transmitted based on the stock related information data shown in FIG. 15. With this configuration, the player can selectively receive the information related to the brand virtually owned by the player in the game space.

Figure 17:
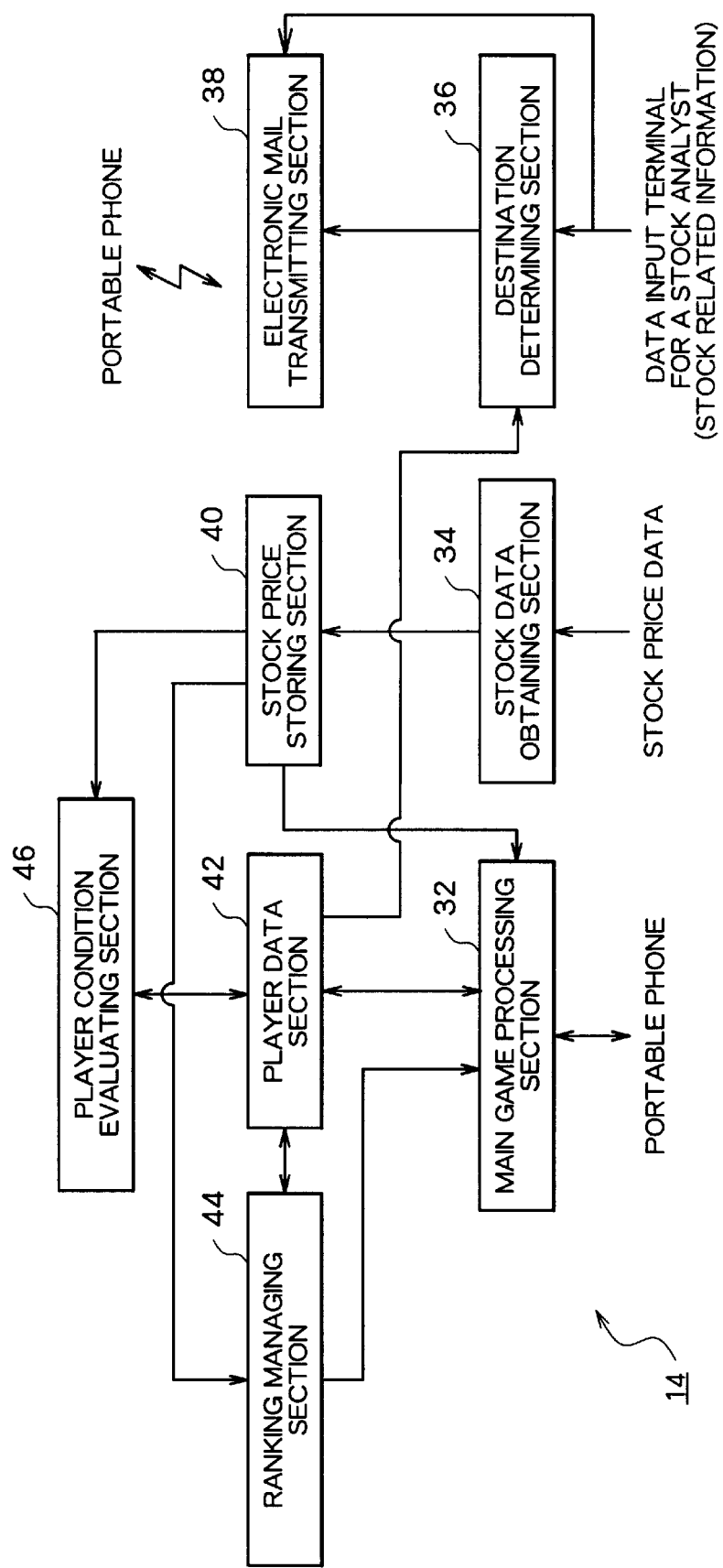
FIG. 17 is a diagram showing the functional blocks of the game server.

FIG. 17 shows functional blocks of the game server 14 according to the embodiment. As shown in FIG. 17, the game server 14 comprises a main game processing section 32, a stock price data obtaining section 34, a destination determining section 36, an electronic mail transmitting section 38, stock price data storing section 40, a player data storing section 42, a ranking managing section 44, and a player condition evaluating section 46. The game server 14 is constructed from a computer system, and these functional blocks are implemented by computer hardware and computer software (computer program). The computer software for implementing these functional blocks are supplied to the game server 14 from an information storage medium such as, for example, a CD-ROM. Alternatively, the computer software can be supplied from an external computer via a communication channel.

The main game processing section 32 receives various URLs, which are the game manipulation inputs, from a portable phone 22 carried by a player and returns hypertext in response to the received URLs to the portable phone 22. The game screens such as, for example, the game screens shown in FIGS. 2 through 13 are displayed on the display of the portable phone 22 using the hyper text. In addition, the main game processing section 32 updates the main player data and player-owned brand data for each player stored in the player data storing section 42 based on the URL (selling order or buying order) transmitted from the portable phone 22.

The stock price data obtaining section 34 receives the stock price data distributed from a broker or a stock exchange. In the embodiment, the stock price data is obtained every five minutes with a delay of 20 minutes the real life situation. The stock price data thus obtained is stored in the stock price data storing section 40. FIG. 18 shows the content of the stock price data to be stored in the stock price data storing section 40. The stock price data shown in FIG. 18 is stored in the stock price data storing section 40 for each brand. As shown in FIG. 18, the stock price data includes "brand code", "bond type", "exchange code", "condition", "opening price", "time for opening", "high", "time for high", "low", "time for low", "current price", "time for current price", "number of stockvolume", "time for stockvolume", "closing price of the previous day", "comparison to previous day", "percentage rise/fall", "date of high of the year", "high of the year", "date of low of the year", "low of the year", "33 business type name", "face value", "board lot", "formal company name in Japanese", "abbreviated company name", "formal company name represented in Japanese letters", "formal company name represented in alphabetic characters", and "additional abbreviations". Among these, the "current price" and "time for current price" or the like are updated every five minutes based on the stock price data obtained at the stock price data obtaining section 34.

The player data storing section 42 is for storing the current condition of the player or the like, and stores the main player data shown in FIG. 19 and player-owned brand data shown in FIG. 20. In the main player data shown in FIG. 19, the "player ID" is the information for identifying each player. For example, the phone number of the portable phone 22 used by a player can be used as the player ID. The "penname" is the name of the player for identifying the player in the game space. For example, a name input by the player using the push button of the portable phone 22 or the like is stored in the "penname" column. The "game flag" represents the course of the game in which the player is currently participating. For example, a flag of "3" represents that the player is in the expert course (with the seed money of 1 million yen), a flag of "2" corresponds to an intermediate course (with the seed money of 5 million yen), and a flag of "1" indicates a beginner course (with the seed money of 10 million yen). When a player designates a course via the push button of the portable phone 22 or the like, the value corresponding to the designated course is stored in the "game flag" column. The "game start date" indicates the date in which the player started playing the game. The main game processing section 32 sets the game start date from, for example, the timing that the player transmitted the URL for participation registration to the virtual stock trade game, the time when the game server 14 received such a URL, the time when the player transmitted the URL for the first stock trade (that is, the first buying order), or the time when the game server 14 received such a URL. The set game start date is recorded in the "game start date" column shown in FIG. 19. The "game time" is the elapsed time in days from the "game start date" to the current date. The main game processing section 32 increments the number of days in the "game time" column by one every day. The "game completion date" shows the time when a game is completed. Game completion is set as, for example, when the total value of the assets virtually owned by the player in the game space exceeds a target value (here, the target value is set at 100 million yen). The assets of the player can be evaluated based on cash only or based on stock only. The stock asset can be judged based on the instant value of the stock price (the stock price data obtained every five minutes) or based on the closing price for the previous day. Alternatively, the stock asset can be evaluated using various other stock prices such as, for example, the high for that day. The completion of the game is judged by the player condition evaluating section 46 based on each stored content of the player data storing section 42 and the stock price data storing section 40. Upon completion of the game, the "game completion date" and the "game time" are set by the player condition evaluating section 46.

The "number of trades (today)" indicates the number of trades during that day and the "number of trades (total)" shows the total number of trades from the "game start date". The "number of trades (today)" and "number of trades (total)" are updated by the main game processing section 32 based on the game manipulation input (selling order and buying order) from the player.

Upon completion of the game, the number of days from the "game start date" until the "game completion date" is stored in the "game time" and the total number of trades from the game start date until the game completion date is stored in the "number of trades (total)". Here, the "game time" and "number of trades (total)" represent the efficiency of the player in achieving assets of 100 million yen. In the embodiment, a ranking is produced from the "game time" and distributed to the players. In this manner, the players repeat playing the game to more efficiently achieve the target sum in a shorter period of time than the other players. Also, by producing a ranking from the "number of trades (total)" from the start of the game until the completion of the game (target achieved) and distributing such a ranking to the players, the players repeat playing the game to more efficiently achieve the target sum with fewer number of trades than the other players.

The "cash" shown in FIG. 19 is for recording the cash value currently owned by the player and the "evaluated value (today)" is the evaluated value of the stock asset based on the most recent stock price data. The "evaluated value (yesterday)" is the evaluated value of the stock asset based on the closing price of the previous day. The "evaluated value ranking" stores the standings of the "evaluated value (yesterday)" for each player among the players participating in the virtual stock trade game. The "cash" is updated by the main game processing section 32 based on the game manipulation input (selling order and buying order) from the player. The "evaluated value (today)" and the "evaluated value (yesterday)" are updated by the player condition evaluating section 46 based on the stored contents of the stock price data storing section 40 and the player data storing section 42 (specifically, the player-owned brand data (current condition data)). Moreover, the "evaluated value ranking" is updated daily by the ranking managing section 44. More specifically, the ranking managing section 44 sorts the "evaluation value (yesterday)" contained within the main player data for each player at a predetermined interval and stores the standings for each of the players in the "evaluated value ranking" column. Upon receiving a portfolio publicizing request from a player with a designation of a player with a better score, the main game processing section 32 returns, to the player, all or a portion of the portfolio of the designated player. The publicizing target portfolio can be produced by the main game processing section 32 based on the stored contents in the player data storing section 42 and in the stock price data storing section 40, or stored when various rankings are produced by the ranking managing section 44.

The player data storing section 42 also stores the player-owned brand data shown in FIG. 20. The player-owned brand data is for storing the "owned brand code", the "number of owned stocks for the brand", and the "cost for the owned brand" in association with the "player ID". The player-owned brand data is stored in the player data storing section 42 based on the number of stocks for the brand owned by the player. In the player-owned brand data shown in FIG. 20, the "cost for the owned brand" represents the average price for one stock when the player bought the stock for the brand. In this manner, it is no longer necessary to store the cost for each buying decision. The "owned brand code" is a column for recording the stock brand code virtually owned in the game space by the player identified by the player ID, and the "number of owned stocks for the brand" is a column for recording the owned number of stocks for the brand code. These items of information are set and updated by the main game processing section 32 in response to the URL (selling order and buying order) transmitted from the portable phone 22. The player-owned brand data shown in FIG. 20, in addition to representing the contents of the game manipulation input from the portable phone 22 by the player, is data which forms the basis for calculating the final score or progress score (score related manipulation content data). The data related to a player with a better score are read out by the main game processing section 32, to be provided to the other players.

The ranking managing section 44 manages and holds various rankings based on the stored contents of the player data storing section 42 and the stock price data storing section 40. In the virtual stock trade game of the embodiment, the evaluated value ranking (evaluated value standings table), time trial ranking, and brand possession ranking are provided to the player. The ranking managing section 44 produces and holds these rankings. More specifically, the "penname" and "evaluated values (yesterday)" for each of the 20 top players having the largest "evaluated value (yesterday)" in the main player data are held as the evaluated value ranking data. The "penname" and "game time" for each of the 20 top players having the shortest "game time" in the main player data from among those who completed the game are held as the time trial ranking data. Moreover, the stock brands which are owned most by the players in the virtual stock trade game from all the stock brands are checked based on the player-owned brand data, and the "brand code" and "abbreviated company name", for example, are held, along with the total number of possessed stocks (the total sum of the number of owned stocks for the brand by all the players) for the 20 most popular brands as a brand possession ranking. The ranking managing section 44 also produces and holds the volume ranking of the day, ranking of price increase percentage, and ranking of the price decrease percentage based on the stock price data stored in the stock price data storing section 40. These various rankings are read out by the main game processing section 32 and suitably provided to the portable phone 22.

Stock related information data as shown in FIG. 15 is supplied from the data input terminal 12 for a stock analyst to the game server 14. The stock related information data contains brand code, and when the data is input to the destination determining section 36, the brand code contained in the data is read out. At the destination determining section 36, the player-owned brand data stored in the player data storing section 42 are read out, and the player IDs for players who owns the brand stock specified by the brand code contained in the stock related information data are extracted. The "mail address" for the extracted player IDs are read out from the main player data. The mail address becomes the destination for the stock related information. These mail addresses are supplied to the electronic mail transmitting section 38. The electronic mail transmitting section 38 is also supplied with the stock related information data, and produces and transmits an electronic mail having the stock related information as the main text and each mail address supplied from the destination determining section 36 as the destination. In addition to a personal computer and a mobile information terminal, the electronic mail is transmitted to the portable phone 22 when the portable phone 22 includes the electronic mail receiving function. The electronic mail can be an internet mail or a "mobile mail" that is commonly used with the portable phone 22. From the game server 14, the stock related information related to the brands virtually owned by the player in the game space is selectively transmitted in the form of an electronic mail. Because of this, the players are ale to obtain only useful information and use this information for stock trading.

As described above, according to the game system 10 of the embodiment, the stock assets of each player are evaluated based on real life stock price data in a virtual stock trade game for virtually trading stocks in the game space. Thus, the game can be made interesting and appeal strongly to the players.

By providing the time trial ranking to let the players compete for a period of time until the assets are increased from the seed money to 100 million yen, a new player can start the game under almost the same circumstances as the preceding players, regardless of the time they start participating. Moreover, even after the target value is achieved, the players can play the game again in an attempt to achieve the target value in a shorter period of time.

By selectively sending the stock related information for the stock brands virtually owned by the players via electronic mail, the players can be provided with necessary and sufficient information for effective use in the virtual stock trading within the game space.

By publicizing, to the other players, the stock brands owned by the players who are high up in the ranking, when providing the time trial ranking, the other players can refer to the publicized data for his/her own stock trading. By publicizing the owned brands (that is, the playing style) of the players who are high in the ranking, in association with the ranking, it is possible to generate interest in the ranking, thereby satisfying the ego of the players in the ranking.

The present invention is not limited to the above embodiment.

For example, in the above description, a game is provided from the game server 14 to the portable phones 22. However, the game can be provided to any computer capable of network connection, such as, for example, a consumer game machine, a personal computer, and a mobile information terminal.

In addition to a case where the game is provided to a plurality of portable phones 22 via the Internet 18, it is also possible to provide the game to a player based on the real life stock price data by integrating the functions of the game server 14 and the portable phone 22 as a standalone game machine.

In the above description, the players compete for the time trial ranking. It is also possible to let the players compete for the number of game manipulations (such as, for example, number of trades) until a predetermined condition (for example, achievement of a target value) is satisfied in the evaluation of the current condition (for example, the total asset value) of the player. In any case, by allowing the players to compete with efficiency as an objective until a certain condition is achieved, a new player can start a game under almost the same circumstances as the preceding players regardless of when they start participating. The players can continue to retry the game even after the target value has been achieved, in order to achieve the target value in a reduced period of time.

In the above description, the game system 10 is configured to provide a virtual stock trade game, but it is also possible to configure the game system 10 to provide any type of virtual venture trading game such as, for example, a virtual estate trade game, a virtual exchange trade game, a virtual futures trade game, and a virtual option trade game. It is also possible to obtain data representing the results or the progress of a real life sport (for example, baseball or soccer) and to provide a game (for example, a sport betting game) based on the obtained data.

The technology for selectively distributing the stock related information associated with the stock brands virtually owned by the player can not only be used in the game system 10 for providing a virtual stock trade game, but can also be applied to a real life stock trade. In this case, the stock brands owned by the customers in real life is managed at a server, and when the stock related information is uploaded, in association with the stock brand, from the data input terminal for a stock analyst to the server, the stock related information can be selectively transferred to the customers who own the stocks for that brand. In this manner, the customers can selectively obtain the information with higher priority and use the information for stock trading. Management of the stock brands owned by a customer at the server can be realized easily by intermediating, for example, online trade at the server or at another server connected to the server by communication connection.

What is claimed is:

1. A game system for providing a game to a plurality of players, comprising:

score related manipulation content data storing means for storing score related manipulation content data which represents the content of the game manipulation input of each player in a current game and which is used as a basis for calculating a final score or progress score of each player;

player selecting means for selecting at least one player from among said plurality of players; and information providing means for providing information related to the content of the game manipulation input of said selected player in a current game based on said score related manipulation content data of said player selected by said player selecting means, to at least one player different from said selected player.

2. The game system of claim 1, wherein said player selecting means selects at least one player from among said plurality of players based on the game score of each player.

3. The game system of claim 2, wherein said information providing means provides said information in association with the final or progress score of said selected player.

4. The game system of claim 1, wherein said information providing means provides said information in association with the final or progress score of said selected player.

5. A game system for providing a game to a plurality of players, comprising:
   score related manipulation content data storing means for storing score related manipulation content data which represents the content of the game manipulation input of each
   player and which is used as a basis for calculating a final score or progress score of each player; player selecting means for selecting at least one player from among said plurality of players; and
   information providing means for providing information related to the content of the game manipulation input of said selected player based on said score related manipulation content data of said player selected by said player selecting means, to at least one player different from said selected player, wherein
   said game system is configured to provide a virtual venture trade game to a plurality of players, in which virtual venture trade is performed in a game space;
   said score related manipulation content data storing means stores, as said score related manipulation content data, owned venture target data which represents that venture target virtually owned by each player in the game space, currently or in the past; and
   said information providing means provides information related to the venture target virtually owned by said selected player in the game space, currently or in the past, based on said owned venture target data.

6. The game system of claim 5, wherein said player selecting means selects at least one player from among said plurality of players based on the game score of each player.

7. The game system of claim 5, wherein said information providing means provides said information in association with the final or progress score of said selected player.

8. A game providing method for providing a game to a plurality of players, comprising:
   a score related manipulation content data storing step for storing score related manipulation content data which represents the content of the game manipulation input of each player in a current game and which is used as a basis for calculating a final score or progress score of each player;
   a player selecting step for selecting at least one player from among said plurality of players; and
   an information providing step for providing information related to the content of the game manipulation input of said selected player in a current game based on said score related manipulation content data of said player selected by said player selecting step, to at least one player different from said selected player.

9. An information recording medium for recording a program which causes a computer to function as a game system for providing a game to a plurality of players, said program causing the computer to execute the steps of:
   storing score related manipulation content data which represents the content of the game manipulation input of each player in a current game and which is used as a basis for calculating a final score or progress score of each player;
   selecting at least one player from among said plurality of players; and
   providing information related to the content of the game manipulation input of said selected player in a current game based on said score related manipulation content data of said player selected by said player selecting means, to at least one player different from said selected player.

10. A game system for providing a stock trade game, for virtually trading stocks in a game space, to a plurality of players, said system comprising:
    owned stock brand data storing means for storing the owned stock brand data which represents the stock brand currently and virtually owned by each player in the game space;
    player selecting means for selecting at least one player from among said plurality of players; and
    information providing means for choosing a portion of stock brands currently owned by the player selected by said player selecting means based on said owned stock brand data and on the stock brands currently owned by other players, and for informing at least one player different from said selected player, of said chosen portion of stock brands.

11. A game system for providing a virtual stock trade game to a plurality of players in which real stock is virtually traded in a game space and the value of stocks owned by the players is evaluated based on the stock price data in real life, said game system comprising:
    owned stock brand data storing means for storing owned stock brand data which represents the stock brands currently and virtually owned by each player in the game space;
    player selecting means for selecting at least one player from among said plurality of players; and
    information providing means for choosing a portion of stock brands currently owned by the player selected by said player selecting means based on said owned stock brand data and on data representing the real life stock trading condition or virtual stock trading condition in said game space, and for informing at least one player different from said selected player, of said chosen portion of stock brands.

12. The game system of claim 11, wherein said data representing the real life stock trading condition includes data representing real life volume ranking or virtual volume ranking in said game space.

13. The game system of claim 12, wherein said information providing means chooses, as said portion, stock brands currently owned by said selected player and which are lower in said volume ranking than a predetermined standing.

14. The game system of claim 11, wherein said data representing the real life stock trading condition includes data representing real life volume of each stock brand or virtual volume of each stock brand in said game space.

15. The game system of claim 14, wherein
said information providing means chooses, as said portion, stock brands currently owned by said selected player and which have said volume lower than a predetermined volume.

16. A game providing method for providing a stock trade game, in which stock is virtually traded in a game space, to a plurality of players, said method comprising:
- an owned stock brand data storing step for storing, in storing means, owned stock brand data which represents the stock brands currently and virtually owned by each player in the game space;
- a player selecting step for selecting at least one player from among said plurality of players; and
- an information providing step for choosing a portion of stock brands currently owned by the player selected at said player selecting step based on said owned stock brand data and on the stock brands currently owned by other players, and for informing at least one player different from said selected player, of said chosen portion of stock brands.

17. A game providing method for providing a virtual stock trade game to a plurality of players in which a real stock is virtually traded in a game space and the value of stocks owned by the players is evaluated based on the stock price data in real life, said method comprising:
- an owned stock brand data storing step f or storing, in storing means, owned stock brand data which represents the stock brands currently and virtually owned by each player in the game space;
- a player selecting step f or selecting at least one player from among said plurality of players; and
- an information providing step for choosing a portion of stock brands currently owned by the player selected at said player selecting step based on said owned stock brand data and on data representing the real life stock trading condition or virtual stock trading condition in said game space, and for informing at least one player different from said selected player, of said chosen portion of stock brands.

* * * * *